United States Patent
Lomet et al.

(10) Patent No.: US 6,182,086 B1
(45) Date of Patent: *Jan. 30, 2001

(54) CLIENT-SERVER COMPUTER SYSTEM WITH APPLICATION RECOVERY OF SERVER APPLICATIONS AND CLIENT APPLICATIONS

(75) Inventors: David B. Lomet, Redmond, WA (US); Gerhard Weikum, Saarbruecken (DE)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/033,511

(22) Filed: Mar. 2, 1998

(51) Int. Cl.[7] .................................................. G06F 17/30
(52) U.S. Cl. ........................... 707/202; 707/8; 707/203; 709/101; 709/313; 711/161; 714/16
(58) Field of Search ............................. 707/4, 8, 202, 707/204, 203; 395/182.14; 711/161, 133, 135; 714/16, 19; 709/101, 106, 133, 135, 312, 313, 320

(56) References Cited

U.S. PATENT DOCUMENTS

| | | | |
|---|---|---|---|
| 5,170,480 | * 12/1992 | Mohan et al. | 707/202 |
| 5,280,611 | * 1/1994 | Mohan et al. | 707/202 |
| 5,287,501 | * 2/1994 | Lomet | 707/202 |
| 5,325,528 | * 6/1994 | Klein | 709/313 |
| 5,369,757 | * 11/1994 | Spiro et al. | 707/202 |
| 5,485,608 | * 1/1996 | Lomet et al. | 707/202 |
| 5,524,205 | * 6/1996 | Lomet et al. | 395/182.14 |
| 5,581,750 | * 12/1996 | Haderle et al. | 707/202 |
| 5,701,480 | * 12/1997 | Raz | 709/101 |

(List continued on next page.)

OTHER PUBLICATIONS

Lomet, "Persistent Application Using Generalized Redo Recovery", Microsoft Corporation, Redmond, Washington, Undated 23–27 Feb. 1998, pp. 154–163 Proceeding 14th International Conference on Data Engineering.

(List continued on next page.)

Primary Examiner—Hosain T. Alam
Assistant Examiner—Shahid Alam
(74) Attorney, Agent, or Firm—Lee & Hayes, PLLC

(57) ABSTRACT

A client-server computer system has one or more clients connected to one or more servers. During request/reply interactions, a client-side application sends a request for services (e.g., read a file, return some information, update a database record, process data, etc.) to the server. A server-side application request program processes the request, prepares a reply to the request, and returns the reply to the client-side application. The server runs a resource manager to log operations and data pages in a manner that enables application and database recovery. Among other tasks, the server's resource manager creates a stable log file that can be used to help recover the client-side application in the event of a system crash. To capture the client-server interaction, the server's resource manager records the reply in the log buffer and commits the reply record to the stable log before the reply is sent back to the client. This results in only one forced logging event for each request/reply exchange. The server further maintains an active application table and a message lookup table to speed recovery. The active application table lists all currently active applications running at the client and server to identify those applications that should be recovered. The message lookup table keeps copies of the logged replies that can be used during client recovery in place of the logged records to avoid searching the server's stable log file. The server further truncates parts of its stable log file when notified that reply log records are no longer needed by the client.

74 Claims, 7 Drawing Sheets

U.S. PATENT DOCUMENTS

| | | | | |
|---|---|---|---|---|
| 5,857,207 | * | 1/1999 | Lo et al. | 707/203 |
| 5,870,763 | * | 2/1999 | Lomet | 707/202 |
| 5,933,838 | * | 8/1999 | Lomet | 707/202 |
| 5,946,698 | * | 8/1999 | Lomet | 707/202 |
| 6,067,550 | * | 5/2000 | Lomet | 707/202 |

OTHER PUBLICATIONS

Strom et al., "Optimistic Recovery in Distributed Systems", ACM Transactions on Computer Systems, Vol. 3, No. 3, Aug. 1985, pp.204–226.

Borg et al. "A Message System Supporting Fault Tolerance", Auragen Systems Corporation, 1983, pp. 90–99 Proceeding of the 9th ACM Symposium on Operating Systems Oct. 10–13 1983.

Borr, "Transaction Monitoring In Encompass [TM]: Reliable Distrubuted Transaction Processing", Tandem Computers Incorporated, Cupertino, CA, 1981 IEEE, pp. 155–165 Proceedings of the 7th International Conf. on VLDB, Sep. 9–11 1981.

Elnozaky et al., "Survey of Rollback–Recovery Protocols in Message–Passing Systems", Carnegie Mellon University, Pittsburgh, P.A. School of Computer Science, Report No. CMU–C3–99–145, Jun. 1999, pp. 1–46.

Johnson et al. "Sender–Based Message Logging", Department of Computer Science, Rice University, Houston, TX, FTCS 17: Digest of Papers. The Seventeenth International Symposium on Paula–Tolerant Computing (Cat No. 87CB2418–2) IEEE Comput. Soc. Press, Jul. 6–8 1987, xvi–311 pp..

Alvisi et al., "Message LoggingPessimistic: Optimistic, Casual, and Optimal", IEEE Transaction On Software Engineering, Vol. 24, No. 2, Feb. 1998, pp. 149–159.

Bartlett, "A Non–Stop * Kernel" Tandem Computers, Inc., Cupertino, CA, Operating System Review, Vol. 15, No. 5, Dec. 1981, pp. 22–29.

Bernstein et al., "Implementing Recoverable Request Using Queues", Digital Equipment Corp., Proceedings of the 1990 SCM Signod International Conference on Management of Data and Symposium on Principles of Database Systems, May 23–26 1990, pp.112–122.

Borg et al., "Fault Tolerance Under UNIX", ACM Transaction on Computer Systems, Vol. 7, No. 1, Feb. 1989, pp.1–24.

Biliris, A. et al., "Transactions in the client–server EOS object store", Proceedings of the Eleventh International Conference on Data Engineering, 1995., Mar. 6–10, 1995, pp. 308–315.*

Mohan, C. et al., "Aries/CSA: a method for database recovery in client–server architectures", Proceedings of the 1994 ACM SIGMOND International Conference on Management of Data and Symposium on Principles of Database Systems, May 24–27, 1994, pp. 55–66.*

Schuldt, Heiko et al., "Concurrency control and recovery in transactional process management", Proceedings of the eighteenth ACM SIGMOND–SIGACT–SIGART Symposium on Principles of Database Systems, May 31 –Jun. 3, 1999, pp. 316–326.*

Silva, L. M. et al., "On the optimum recovery of distributed programs", Proceedings of the 20th EUROMICRO Conference on System Architecture and Integration, Sep. 5–8, 1994, pp. 704–711.*

Slye, J. H. et al., "Support for software interrupts in log–based rollback–recovery", IEEE Transaction on Computers, Oct. 1998, vol. 47, Issue: 10, pp. 1113–1123.*

Stamos, J. W. et al., "A low–cost atomic commit protocol", Proceedings of the Ninth Symposium on Reliable Distributed Systems, 1990., Oct. 9–12, 1990, pp. 66–75.*

Bahannon, Philip et al., "Distributed multi–level recovery in main–memory databases", Fourth International Conference on Parallel and Distributed Information Systems, 1996. Dec. 18–20, 1996, ISBN: 0–8186–7475–X, pp. 44–55.*

Mohan, C. et al., "ARIES: A Transaction Recovery Method Supporting Fine–Granularity Locking and Partial Rollbacks Using Write–Ahead Logging," ACM Transactions on Database Systems, vol. 17, No. 1, Mar. 1992 pp. 94–162.*

Alvisi et al., "Message Logging Pessimistic, Optimistic, Casual, and Optimal", IEEE Transactions On Software Engineering, vol. 24, No. 2, Feb. 1998, pp. 149–159.

Bartlett, "A Non–Stop * Kernel" Tandem Cuter, Inc., Cupertino, CA, 1981, pp. 22–29.

Bernstein et al., "Implementing Recoverable Requests Using Queues", Digital Equipment Corp., 1990, pp. 112–122.

Borg et al, "A Message System Supporting Fault Tolerance", Auragen Systems Corporation, 1983, pp. 90–99, Proceedings of the 9th ACM Symposium on Operating Systems, 10–13 Oct. 1983.

Borg et al., "Fault Tolerance Under UNIX", ACM Transactions on Computer Systems, vol. 7, No. 1, Feb. 1989, pp. 1–24.

Borr, "Transaction Monitoring In Encompass [TM]: Reliable Distributed Transaction Processing", Tandem Computers Incorporated, Cupertino, CA, IEEE, pp. 155–165 Proceedings of the 7th International Conf. on VLDB, 9–11 Sept. 1981.

Elnozahy et al., "Survey of Rollback–Recovery Protocols in Message–Passing Systems", Undated, pp. 1–46.

Johnson et al., "Sender–Based Message Logging", Department of Computer Science, Rice University, Houston, TX, Undated.

Lomet, "Persistent Applications Using Generalized Redo Recovery", Microsoft Corporation, Redmond, Washington, Undated 23–27 Feb. 1998, pp. 154–163 Proceedings 14th International Conference on Data Engineering.

Strom et al., "Optimistic Recovery in Distributed Systems", ACM Transactions on Computer Systems vol. 3, No. 3, Aug. 1985, pp. 204–226.

* cited by examiner

CLIENT-SERVER COMPUTER SYSTEM WITH APPLICATION RECOVERY OF SERVER APPLICATIONS AND CLIENT APPLICATIONS

TECHNICAL FIELD

This invention relates to client-server computer systems. More particularly, this invention relates to methods for recovering from system crashes in a manner that ensures that the applications running on the clients and servers persist across the crash.

BACKGROUND

Computer systems occasionally crash. A "system crash" is an event in which the computer quits operating the way it is supposed to operate. Common causes of system crashes include power outage, application operating error, and computer goblins (i.e., unknown and often unexplained malfunctions that tend to plague even the best-devised systems and applications). System crashes are unpredictable, and hence, essentially impossible to anticipate and prevent.

A system crash is at the very least annoying, and may result in serious or irreparable damage. For standalone computers or client workstations, a local system crash typically results in loss of work product since the last save interval. The user is inconvenienced by having to reboot the computer and redo the lost i1 work. For servers and larger computer systems, a system crash can have a devastating impact on many users, including both company employees as well as its customers.

Being unable to prevent system crashes, computer system designers attempt to limit the effect of system crashes. The field of study concerning how computers recover from system crashes is known as "recovery." Recovery from system crashes has been the subject of much research and development.

In general, the goal of redo recovery is to return the computer system after a crash to a previous and presumed correct state in which the computer system was operating immediately prior to the crash. Then, transactions whose continuations are impossible can be aborted. Much of the recovery research focuses on database recovery for database computer systems, such as network database servers or mainframe database systems. Imagine the problems caused when a large database system having many clients crashes in the midst of many simultaneous operations involving the retrieval, update, and storage of data records. Database system designers attempt to design the database recovery techniques which minimize the amount of data lost in a system crash, minimize the amount of work needed following the crash to recover to the pre-crash operating state, and minimize the performance impact of recovery on the database system during normal operation.

FIG. 1 shows a database computer system 20 having a computing unit 22 with processing and computational capabilities 24 and a volatile main memory 26. The volatile main memory 26 is not persistent across crashes and hence is presumed to lose all of its data in the event of a crash. The computer system also has a non-volatile or stable database 28 and a stable log 30, both of which are contained on stable memory devices, e.g. magnetic disks, tapes, etc., connected to the computing unit 22. The stable database 28 and log 30 are presumed to persist across a system crash. The persistent database 28 and log 30 can be combined in the same storage, although they are illustrated separately for discussion purposes.

The volatile memory 26 stores one or more applications 32 and a resource manager 34. The resource manager 34 includes a volatile cache 36, which temporarily stores data destined for the stable database 28. The data is typically stored in the stable database and volatile cache in individual units, such as A cache manager 38 executes on the processor 24 to manage movement of data pages between the volatile cache 36 and the stable database 28. In particular, the cache manager 38 is responsible for deciding which data pages should be moved to the stable database 28 and when the data pages are moved. Data pages that are moved from the cache to the stable database are said to be "flushed" to the stable state. In other words, the cache manager 38 periodically flushes the cached state of a data page to the stable database 28 to produce a stable state of that data page which persists in the event of a crash, making recovery possible.

The resource manager 34 also has a volatile log 40 that temporarily stores log records for operations, which are to be moved into the stable log 30. A log manager 42 executes on the processor 24 to manage when the operations are moved from the volatile log 40 to the stable log 30. The transfer of an operation from the volatile log to the stable log is known as a log flush.

During normal operation, an application 32 executes on the processor 24. The resource manager receives requests to perform operations on data from the application. As a result, data pages are transferred to the volatile cache 36 on demand from the stable database 28 for use by the application. During execution, the resource manager 34 reads, processes, and writes data to and from the volatile cache 36 on behalf of the application. The cache manager 38 determines, independently of the application, when the cached Data State is flushed to the stable database 28.

Concurrently, the operations being performed by the resource manager on behalf of the application are being recorded in the volatile log 40. The log manager 42 determines, as guided by the cache manager and the transactional requirements imposed by the application, when the operations are posted as log records on the stable log 30. A logged operation is said to be "installed" when the versions of the pages containing the changes made by the operation have been flushed to the stable database.

When a crash occurs, the application state (i.e., address space) of any executing application 32, the data pages in volatile cache 36, and the operations in volatile log 40 all vanish. The computer system 20 invokes a recovery manager. It begins at the last flushed state on the stable database 28 and replays the operations posted to the stable log 30 to restore the database of the computer system to the state as of the last stably logged operation just prior to the crash.

While database recovery techniques are helpful for recovering data, the database techniques offer no help in recovering an application from a system crash. Usually all active applications using the database are wiped out during a crash. Any state in an executing application is erased and cannot usually be continued across a crash.

There has been some work in designing recovery procedures that preserve applications across a system crash. One preferred approach is an application recovery system developed by David Lomet, an inventor in this invention. The application recovery system is described in a series of patent applications:

1. U.S. Ser. No. 08/814,808, entitled "Database Computer System With Application Recovery", filed Mar. 10, 1997;
2. U.S. Ser. No. 08/813,982, entitled "Database Computer System With Application Recovery And Dependency Handling Read Cache", filed Mar. 10, 1997;

3. U.S. Ser. No. 08/832,870, entitled "Database Computer System With Application Recovery And Dependency Handling Write Cache", filed Apr. 4, 1997; and 4. U.S. Ser. No. 08/826,610, entitled "Database Computer System With Application Recovery And Recovery Log Sequence Numbers To Optimize Recovery", filed Apr. 4, 1997.

All of these patent applications are assigned to Microsoft Corporation and are incorporated by reference. These applications are collectively referred to as the "Lomet applications" throughout this disclosure.

Another approach is to make the application "stateless." Between transactions, the application is in its initial state or a state internally derived from the initial state without reference to the persistent state of the database or to other input. If the application fails between transactions, there is nothing about the application state that cannot be re-created based on the static state of the stored form of the application. Should the transaction abort, the application is replayed, thereby re-executing the transaction as if the transaction executed somewhat later. After the transaction commits, the application returns to the initial state. Gray and Reuter describe this form of transaction processing in a book entitled, *Transaction Processing: Concepts and Techniques,* Morgan Kaufmann (1993), San Mateo, Calif.

Another approach is to write persistent application checkpoints at every resource manager interaction. The notion here is that application states in between resource manager interactions can be re-created from the last such interaction forward. This is the technique described by Bartlett, "A NonStop Kernel," *Proc. ACM Symp. on Operating System Principles* (1981) pages 22–29 Borg et al. "A Message System Supporting Fault Tolerance," *Proc. ACM Symp. on Operating System Principles* (Oct. 1983) Bretton Woods, NH pages 90–99.

The above application recovery techniques are all restricted to recovery local to or under the control of a single recoverable resource manager (database computer system). In the client-server context, however, these recovery techniques are difficult to apply to client-side applications that are interacting with the server.

Prior work on application fault-tolerance in distributed systems is based on some form of application "installation points" and/or "message logging". The prior work can be categorized into the following three approaches, all of which incur high normal operation and/or recovery costs.

1. Fault-tolerant Process Pairs: This approach has aimed to build fault tolerance into the operating system by providing each critical process with a hot-standby backup process, usually on a different processor. When the primary process fails, the backup process takes over and re-executes the application starting from the most recent installation point that has been generated by the primary process. Messages that would be repeated, especially output to the human user, are suppressed during the re-executed path, based on testing sequence numbers against logged messages. While this approach was a pioneering one in the early eighties, it is a heavyweight solution that can be justified only for the most mission-critical high-end applications. The reason for this is that the method requires either an application installation point or a forced message log record at every process interaction. The frequently required disk I/O greatly limits the achievable throughput of both the server and the clients. This approach is described in the above cited Bartlett and Borg papers, as well as by Borr, "Transaction Monitoring in Encompass: Reliable Distributed Transaction Processing," VLDB Conference, Cannes (1981) and by Kim, "Highly Available Systems for Database Applications," *ACM Computing Surveys,* Vol. 16, No. 1 (1984), pp. 71–98.

2. Distributed State Tracking: This approach is based on a model of communicating processes. Processes generate installation points only occasionally and independently of each other. In addition, messages are logged in an optimistic, non-forced manner. When a process fails, it restarts from its most recent installation point, but other processes may also be forced to restart from a former state to guarantee a causally consistent global state. Thus, this line of methods incurs recovery dependencies among the various processes that would be unacceptable for a database server. Furthermore, the eventually restored global state is not necessarily the most recent, externally observed state. This is tolerable when restarting long-running distributed "number-crunching"-style computations, an initial target of this work, but would not mask all application failures from the human user (unless more stringent, forced logging were employed). It is exactly for this reason that this algorithmically deep work has had very little impact on real systems.

A variation of message logging that eliminates recovery dependencies is pessimistic message logging. Unfortunately, this approach is very conservative and thus expensive in that it forces every log record to disk immediately. In general, most of the research in this category ignored both the necessity to minimize logging I/O costs and the importance of log truncation for fast restart. Rather, it overemphasized communication costs, which is less of an issue with modem networks.

3. Persistent Queues: The third line of solutions restricts all interactions between processes to be via persistent queues. Here, when a process sends a message to another process, the sender explicitly enqueues the message to a persistent queue. This takes place within the boundaries of a distributed transaction involving the queue and the sender; so it incurs the high forced logging I/O costs of a two-phase commit protocol. Moreover, the same protocol is used when the receiver dequeues the message. This solution has been very successful in the context of transaction-structured applications such as reservation systems (including "pseudo-conversational" applications), and is even suitable for heterogeneous platforms. However, its disk I/O costs are very high, and applications must be decomposed completely into sequences of transactions with no application state outside of the queued messages.

Despite these efforts, there remains a need to improve application recovery techniques in client-server systems. Particularly, there is a need to attain reliable recovery, while minimizing the logging costs and enabling fast restart. The inventors have developed such application recovery techniques for client-server systems.

SUMMARY

This invention concerns a client-server computer system having one or more clients connected to one or more servers, and techniques for capturing client-server interactions to enable recovery of client-side applications following system crashes. Both the server and the client have a volatile main memory with a log buffer, a non-volatile memory with a stable log, and a processing unit. Both the client and server have their own independent recovery systems which adequately recover database records and application states for applications that do not involve client-server interactions.

In addition to standalone applications, however, the server and client execute one or more client-server applications that are capable of interfacing with one another through normal client-server communications. During a common interaction, the client-side application sends a request for services (e.g., read a file, return some information, process data, etc.) to the server. The server-side application processes the request, prepares a reply to the request, and returns the reply to the client-side application. Each request is self-contained in that everything needed for the request execution is contained within the request.

The server runs a resource manager to log operations and manage data pages in a manner that enables application and database recovery. Among other tasks, the server's resource manager creates a stable log file that can be used to help recover the client-side application in the event of a system crash. To capture the client-server interaction, the server's resource manager records the reply in the log buffer and commits the reply record to the stable log prior to sending the reply back to the client.

If the client subsequently crashes, the client will attempt to restart the client-side application using its stable log file during recovery. Since the client-side application is assumed to be piecewise deterministic, the client regenerates requests from the logged operations, and resubmits the requests to the server during replay. Upon receiving a request, the server recovers the corresponding reply from the server's stable log file and returns the reply. Through this replayed interaction, the client is able to recover to the application state just prior to crash, without itself having logged the replies returned from the server.

A benefit of the recovery scheme is that it adequately captures the entire client-server exchange with only one forced logging event for each request/reply exchange. This is a significant improvement over past message passage recovery techniques. The server does not log the request received from the client. Moreover, the client does not need to forcibly log its request or the reply from the server, although the client may from time to time "lazily" log the replies in its stable log.

To speed recovery, an aspect of this invention involves maintaining an active application table and a message lookup table at the server (and corresponding instances at the client). The active application table lists all currently active applications running at the client and server. This table is used during recovery to identify those applications that should be recovered.

The message lookup table keeps a copy of the logged replies. When the client is replaying its log file during recovery and re-submits requests to the server, the server first checks the message lookup table to determine whether the request can be satisfied by a specific log record therein. The table helps avoid sequentially searching through the server's stable log file record after record. If one or more reply log records become too large, the message lookup table may contain pointers to a separate table on the stable log into which larger active replies can be kept.

The server continuously truncates obsolete parts of its stable log file and message lookup table. The server has no direct information about when it can safely discard log records pertaining to the client reply messages and truncate its log file. Thus, the server relies on stability notifications from the client to inform the server when certain log records are no longer needed. The client sends a stability notification on one of two conditions: (1) the client installs application state of the client-side application or (2) the client writes reply log records to the client's stable log file. When such a notification is received, the server can remove the corresponding reply from the stable log file and from the message lookup table.

When the client-side application completes, the client informs the server using a special notice of termination. In response, the server removes the application from its active application table and all corresponding replies from the message lookup table and stable log file. The server also forces a log record to the stable log file indicating application termination.

One benefit resulting from this client-server recovery scheme is that server recovery is not dependent on the client. The server can recover completely without any dependency on the client. However, the client is dependent on the server for full recovery. This is an acceptable design constraint since the server is considered to be more stable and reliable than the client.

DETAILED DESCRIPTION

This invention concerns a client-server application recovery scheme that renders client application programs persistent across system crashes in a client-server system. In general, the server force logs replies sent back to clients in response to client requests as a means for providing a persistent log against which an application state of a client application can be replayed to enable recovery. According to this scheme, the application recovery scheme allows server recovery independent of client recovery, while client recovery is dependent on the server.

Figure 1:
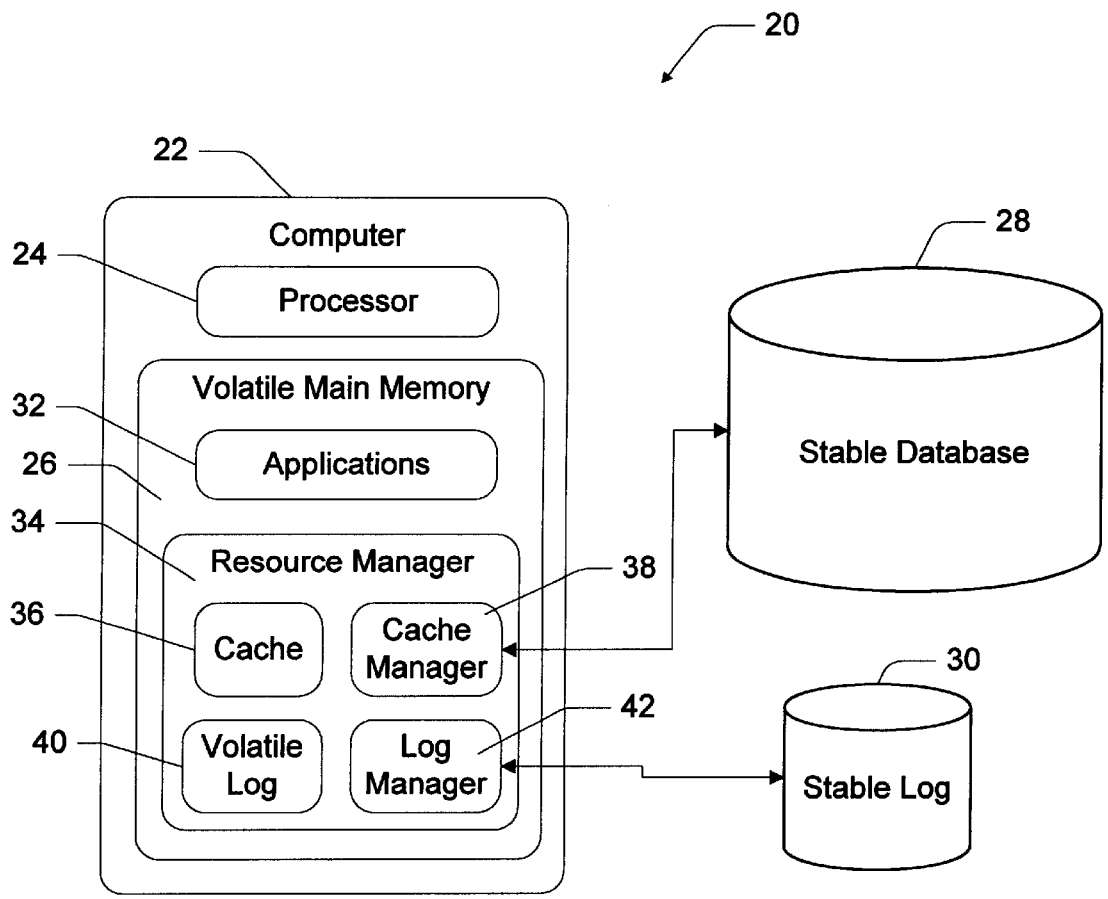
FIG. 1 is a block diagram of a conventional database computer system.
Figure 2:
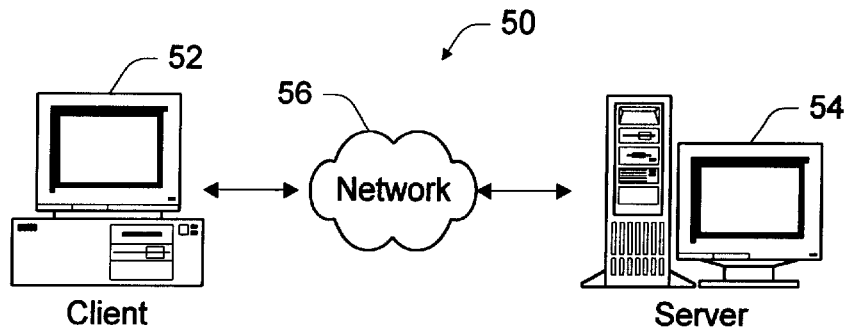
FIG. 2 shows a client-server system that implements a client application recovery scheme.

FIG. 2 shows a client-server system 50 having a client computer 52 connected to a server computer 54 via a network 56 (e.g., LAN, WAN, Internet, etc.). The client 52 is illustrated as a desktop personal computer, but can be implemented in other forms, such as a laptop, a workstation, and so forth. The client 52 runs one or more applications. The client maintains a recovery log that logs user interactions, enabling the client to capture essentially all of the user inputs. The client is not, however, responsible for logging interactions with the server; rather, this task is assigned to the server as is described below in more detail.

The server 54 is illustrated as a server-enabled personal computer, such as a computer configured to run the Windows NT operating system from Microsoft Corporation. However, the server 54 may further be implemented in other forms, such as a UNIX-based server, a minicomputer, or a mainframe. The server is presumed to be servicing more than one client, although only one client is shown for discussion purposes.

The client 52 and server 54 are each assumed to have their own independent recovery systems. In the event of a failure, both the client and/or server can independently recover data records and application states of independently running applications using conventional techniques and those described in the incorporated Lomet applications described in the Background section. However, these recovery techniques do not account for applications dependent on client-server interactions. Parts of the client applications may not be fully recoverable without taking into consideration the client's interactions with the server.

Accordingly, this invention is directed to a recovery system for client-server applications that takes into account client-server interactions. In FIG. 2, the client 52 communicates with the server 54 in conventional fashion. Typically, the client submits requests asking the server to perform some task, such as retrieve a file, or return information, or process some data, or the like. Upon completion of the task, the server sends a reply to the client An aspect of this invention is to log client-server interactions in a meaningful way so that applications executing on the client can persist through a client crash and/or a server crash. In particular, the server logs the reply prior to transmitting the reply back to the client.

Figure 3:
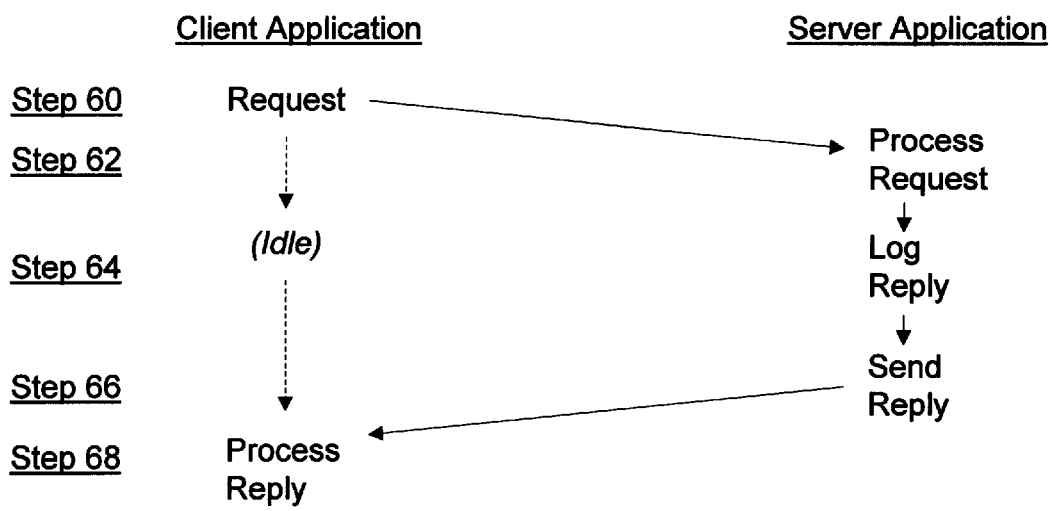
FIG. 3 is a process diagram showing process steps taken at the client and server to log client interactions with the server.

FIG. 3 shows process steps performed by the client and server during an interaction. At step 60, the client sends a request to the server. The server processes the request and prepares a reply (step 62). At step 64, the server logs the reply on the stable log. It does this by flushing the database log buffer to the stable log, including the write log records of the corresponding request-reply pair, with the reply log record being the last log record written. The server then sends the reply across the network (step 66) and the client processes the reply (step 68).

In this process, the server only logs the reply at a time just prior to sending the reply back to the client. This log operation is preferably a forced log operation, meaning that the server commits the reply to the stable log at the time it sends the reply back to the client, and does not wait to commit it at a later time.

In fact, the logging of the reply is the only forced log action per request/reply interaction. The server does not log the request received from the client. Moreover, the client does not log its request or force log the reply from the server. The reasons are twofold. First, if the client sends a request and subsequently crashes before receiving the reply, the server processes the request and logs the reply. During client's normal recovery process, the client will regenerate and resubmit the same request during its replay. The client application is assumed to be piecewise deterministic, meaning that the code will execute, given the same inputs, in exactly the same manner to produce the same results each time it is run. Thus, the same request will be generated during the client application replay. With the client regenerating the original request and the server logging the original response, the process of only logging replies at the server successfully enables recovery of the entire request/reply interaction for client application recovery.

Second, if the server fails after receiving the request and before transmitting a reply, the recovery scheme treats the request as a non-event that is not recovered by the server. Although the client could log the request and the server could then ask the client to resend the request during the server's recovery, this would make the server's recovery dependent on the client. Instead, the application recovery scheme is intentionally designed so that the server is not reliant on the client for recovery. Thus, the application recovery scheme inherently avoids logging client requests.

As a result, the application recovery scheme of this invention reduces the number of forced log writes per request/reply interaction to one. This significantly improves logging efficiency. In contrast, conventional message passage systems require more forced logs, with the standard process requiring at least the force logging of both the request and the reply at either the client or server side.

There is one assumption, however, that enables the application recovery scheme to achieve this optimal efficiency. This assumption is that the client application is synchronous and hence idle between the time it submits a request and the time it receives a reply. This is illustrated in FIG. 3 by the "Idle" condition between the request step 60 and the process reply step 68.

It is noted that the application recovery scheme also supports client applications that make asynchronous requests to the server and then subsequently issue "wait's" for the replies. Asynchronous applications do, however, introduce some complications. If the client application waits for replies from the server in a different order than it made the requests, then the order in which the replies are consumed at the server is no longer monotonically increasing in terms of the message sequence number (MSN). Hence, rather than rely on the garbage collection process which makes use of the MSN, the server would need to explicitly track each message that is no longer needed.

Additionally, with more than one request open at a time, it is possible for the server when executing the requests to reverse the serialization order of the requests—such that a later request serializes before an earlier one. This leads to unpredictable results, which are usually not the intended ones. The server guards against the serialization reversal by actually executing the requests serially (so that io the asynchrony only applies to the client's execution, not to the order of processing its requests). Alternatively, the client application could be required to only have outstanding requests that are independent of each other (and hence have no order dependencies).

Figure 4:
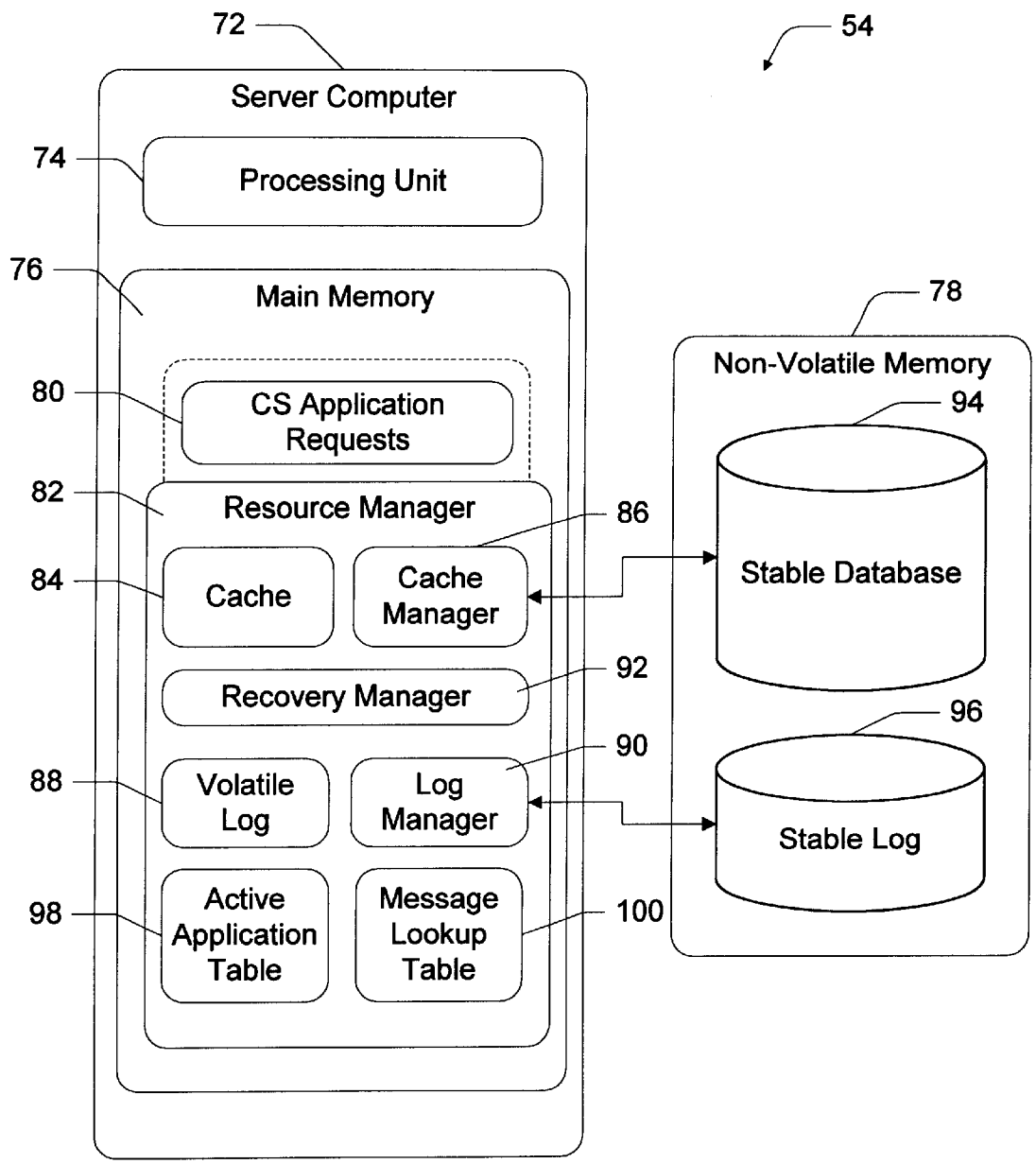
FIG. 4 is a block diagram of a database server used in the client-server system of FIG. 2.
Figure 5:
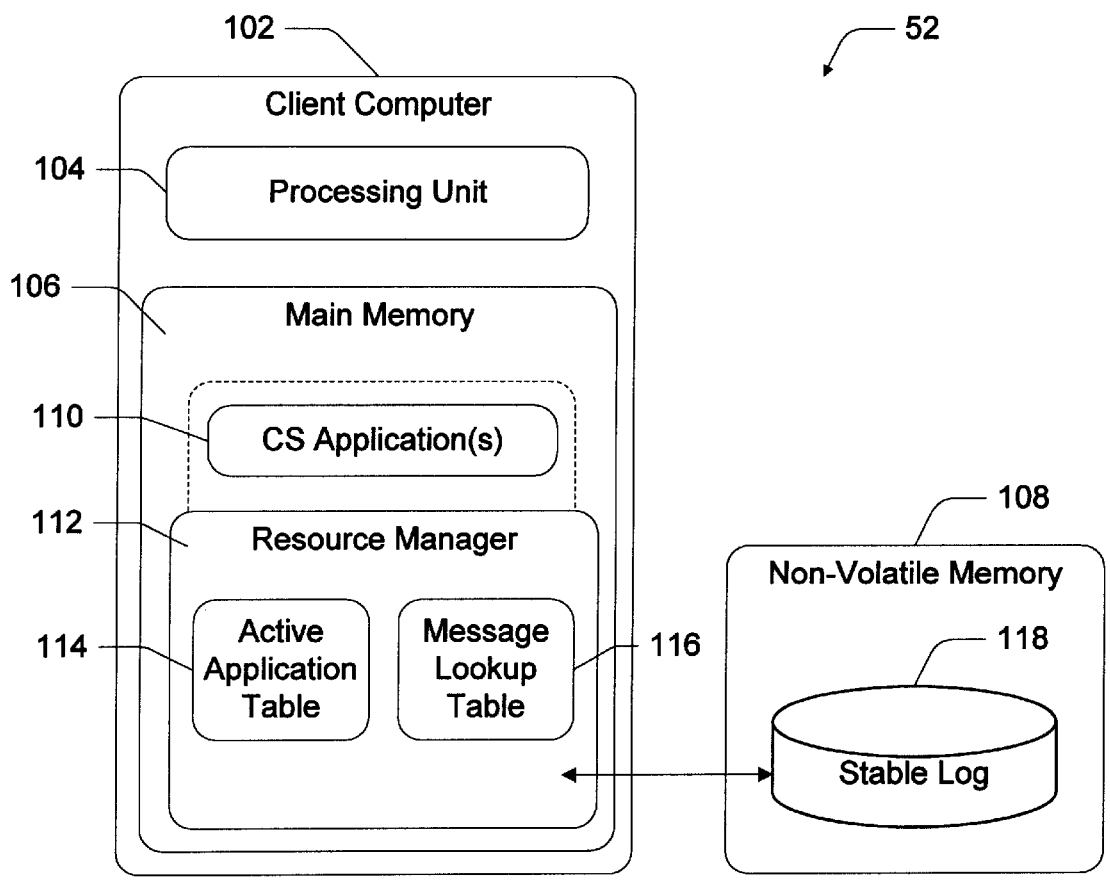
FIG. 5 is a block diagram of a client used in the client-server system of FIG. 2.

FIGS. 4 and 5 show the client and server in more detail. FIG. 4 shows the server 54 implemented as a database server system. It has a computing unit 72, with a processing unit 74 and a volatile main memory 76. The volatile main memory 76 is not persistent across system crashes. It is presumed to lose all data that it presently stores when a crash occurs. Main memory 76 can be implemented, for example, as volatile RAM. The server system 54 also includes a non-volatile memory 78 interfaced with the computer unit 72. The persistent memory 78 is presumed to persist across a system crash. Examples of persistent memory 78 include disk arrays, disk drives (e.g., hard and floppy), read/write CD ROMS, tape backups, reel-to-reel, and the like.

The database server system 54 is shown in an operational state in which one or more client-server application requests 80 are loaded in main memory 76 for execution on the processing unit 74. The application request programs 80 are permanently stored on non-volatile memory (such as the persistent memory 78) and loaded into the main memory 76 when a client requests its execution.

The main memory 76 further includes a resource manager 82 that maintains temporary copies of data pages and application states. The resource manager is responsible for managing when to flush data objects and application request objects, and hence when to install operations into the persistent memory 78. The resource manager is also responsible for posting operations from the volatile log to the stable log. This must be done before the results of an operation are installed in the stable state, thus enforcing a write-ahead log protocol. The resource manager 82 is callable by the application programs 80.

The resource manager 82 includes a volatile cache 84, a cache manager 86, a volatile log 88, a log manager 90, and a recovery manager 92. The volatile cache 84 contains cached states of any executing application 80 and the data pages retrieved from the persistent memory 78. The volatile log 88 tracks the operations performed by the server system.

The non-volatile memory 78 includes a stable database 94 and a stable log 96. The stable database 94 maintains stable versions of the application states (including address spaces) and data objects, and the stable log 96 maintains a sequence of logged operations. The database 94 and log 96 are shown separately, but can be implemented in the same storage subsystem.

The cache manager 86 manages the volatile cache 84 and is responsible for retrieving data records from the stable database 94 and periodically flushing modified data records back to the stable database 94. Additionally, the cache manager 86 manages when to flush cached objects, which may include the application state as an object to be updated in the stable database 94. The log manager 90 manages the volatile log 88 and facilitates posting operations from volatile log 88 onto the stable log 96.

The resource manager 82 also maintains two additional data structures: an active application table 98 and a message lookup table 100. The active application table (AAT) 98 contains status information about ongoing applications (and possibly failed or restarting applications) for which the server or the client is responsible. This table is used during recovery to identify those applications that should be recovered.

The message lookup table (MLT) 100 contains log records of active reply messages to active applications. Active reply messages are those that the client may still need for recovery purposes in the event of a client crash. The message lookup table 100 is used to speed recovery of a client. When a client is replaying its log file and re-submits requests to the server, the server first checks the message lookup table 100 to determine whether the request can be satisfied by a specific log record therein. The table helps avoid sequentially searching through the stable log file record after record. If one or more reply log records become too large, the table 100 may contain pointers to a separate table on the stable log or elsewhere in non-volatile memory into which larger active replies can be kept.

The tables 98 and 100 are implemented as data structures, which generally reside in the volatile main memory 76. The table contents are recoverable from the operations and messages already logged, and the log can be checkpointed by occasionally writing their contents to non-volatile storage.

The server 54 tracks active applications that it is servicing (or those for which its clients are responsible) in the active application table 98. An application remains listed in the table 98 until the application terminates, or (optionally) is timed out after a predetermined length of time. The active application table 98 is useful for determining which applications need to be recovered after a system failure. Only active applications listed on the table 98 are recovered. Applications not listed in the table need not be recovered.

FIG. 5 shows the client 52 in more detail. It has a computing unit 102 with a processing unit 104 and a volatile main memory 106. It also has a non-volatile memory 108 (e.g., disk memory). The client 52 runs one or more applications 110. The client also utilizes a resource manager 112, which performs similar caching and logging functions as the server-side resource manager 82 described above with respect to FIG. 4. These components are not shown for ease of discussion. The client-side resource manager 112 also maintains instances of the active application table 114 and the message lookup table 116. The client 52 also maintains a stable log 118 in the non-volatile memory 108.

Message Tracking

All messages between the client and server are tagged with:

1. a unique application identifier (AppID) that includes an encoding of the corresponding client and is unique across all applications of all clients; and
2. a message sequence number (MSN) that is unique and monotonically increasing within each client application.

The client is assumed to be capable of running multiple applications simultaneously. When an application is launched, an application identifier for that application is placed in the client's active application table 98 and, on first contact with the server, in the server's active application table 114. As the client application passes a message to the server, that message is tagged with an MSN. The server and client use the MSNs to identify and track individual messages exchanged between them.

Server Message Logging

The server 54 generates a log record for each of its own write operations on database objects and each reply message, as well as some additional temporary log records to cope with incomplete requests. The log records are posted in the log buffer 88, which is forced to the stable log 96 whenever it is full or according to the write-ahead-logging rule.

In addition, the log records for active messages are kept in the message lookup table 100. The server 54 forces a reply log record to the stable log 96, by flushing the database log buffer 88, before the reply message is sent to the client 52. Making the reply log record stable does not imply that the reply log record is discarded from the message lookup table 100. As a restarting client may re-request a reply, keeping it in the message lookup table in volatile storage can save random disk I/O on the log file.

To force a reply message to the stable log file 96, the server 54 flushes its log buffer 88 in a single atomic write to the log file. If the message lookup table 100 still contains the corresponding request and log records associated with the request that involved reads of database objects, the request and these "read" log records can be removed from the log buffer, i.e. not written to the stable log. They can be discarded once the atomic log file write is completed.

The server 54 provides request recovery in one of three ways. One approach is to log the request actions at the server in a manner that enables "undo" recovery. With this approach, the log enables the server to "undo" incomplete requests during recovery. If the server knows that the reply to the original request has not yet been sent to the client, the server can relax the obligation of deterministic replay as long as all database writes of concurrently executed requests are kept isolated. The server can then undo a request and re-execute it all over again when the client re-submits the request, as if it were a new request.

A different interleaving with the reads and writes of other requests does not necessarily recreate the effects of the original request. Thus, the undo approach is only valid when the server is sure that the client has not yet seen the original reply. The isolation condition typically holds if a request-reply interaction is inside one ACID transaction, assuming a rigorous database concurrency control protocol such as strict two-phase locking. When a client request initiates a sequence of transactions on the server (e.g., a request that starts a "mini-batch" stored procedure on the server), the undo would have to be based on compensating transactions. The effects of the original transactions would have to be kept quasi-isolated at a higher level of abstraction taking into account application semantics. Without some form of isolation, the "undo" option is not applicable.

A second approach is to log the application request actions at the server in a manner that enables "redo" recovery, meaning that the log enables the server to reconstruct incomplete requests during recovery. The second approach requires the server to log values of all database reads as well as its normal database update logging for a request. During server restart, the incomplete request is redone such that all database reads and writes are intercepted. Read values are extracted from the logged values, and writes are applied to the database using log sequence number (LSN) testing for idempotence. After recovery, the incomplete request then continues execution to completion, logs its reply, and sends the reply to the client as if the server failure had not occurred. This approach has a potential pitfall, whose significance depends on further details of the logging method. Logging read values may greatly increase the amount of data logged.

Whereas the second approach involves a logging of physical read operations that require that the values read be logged, the third approach is a 1 variation of the "redo" recovery scheme that allows logging logical reads. A log record for a logical read capture only the point at which the read occurred and the source of the value. During recovery, the read value is re-read from the original source. To enable this third approach, the server must ensure that recovery reads the same versions of the data as were originally read. However, a potential problem is that the cache manager may write pages back to the permanent database before a crash, and then the version that is required by a read may no longer be available nor reconstructable via redo of the logged write operations. To avoid this problem, the cache manager is prevented from installing a data object into the database whenever its prior version is still necessary for a possibly replayed read, by tracking and enforcing installation dependencies. This third approach to logging logical reads is described in detail in the last three of the Lomet applications referenced in the Background section.

Client Message Logging

A client creates log records for each request and reply message that it exchanges with the server. In addition, it creates log records for each input message from the external world, such as interaction with a human user or some form of external sensor/actor (e.g., in an embedded control system). The reply messages from the server are kept in the message lookup table at the client. The log records for external input are forced to the stable log file 118 immediately. None of the other messages needs to be forced to the stable log file. Rather the client can write them "lazily", using a low-priority write demon in the background. Hence, they are lost should the client crash. However, keeping them in a volatile table enables the client to delay or avoid their logging so as to minimize the client's logging cost.

The client tracks three different message sequence numbers (MSNs). The first MSN is the last used MSN for each of its applications. This MSN is referred to as the "Last-MSN".

The client also tracks a "RedoMSN" for each application. Each application can periodically generate an installation point, saving its state onto stable storage 118, typically into a local file on a per application basis using a shadowing technique to provide atomicity of installation points. Each installation point is treated as a logged message and tagged with an MSN. The "RedoMSN" is either the oldest MSN that follows the most recent installation point of the application or the installation point MSN itself if no more recent message exists.

Once an installation point is completed, all prior log records of the corresponding application can be discarded. They are now lower than the RedoMSN for the application, which is advanced to the MSN of the IP log record. The RedoMSN thus marks the beginning of the redo pass over the log during client recovery for a particular client application.

The client further maintains a "StableMSN" for each application, which serves to track by how much the client is lagging behind the server in terms of its stable message logging. The StableMSN is increased whenever the client has written a set of chronologically consecutive reply messages to the stable log file 118. One concrete policy is to ensure that this "backlog" (relative to the server) is limited by initiating a log file write whenever the difference LastMSN–StableMSN reaches some threshold.

It is noted that the server tracks a "RedoMSN" for each corresponding client application in its active application table 98. The server's RedoMSN has a corresponding redo log sequence number ("RedoLSN") that points to the log file to recover the log record pertaining to the message. The client's StableMSN for a given application is the server's RedoMSN for that application. All message log records that the server has on its stable log file with an MSN smaller than the server RedoMSN of the corresponding application are obsolete and can be garbage-collected (because the client does not need them).

Figure 6:
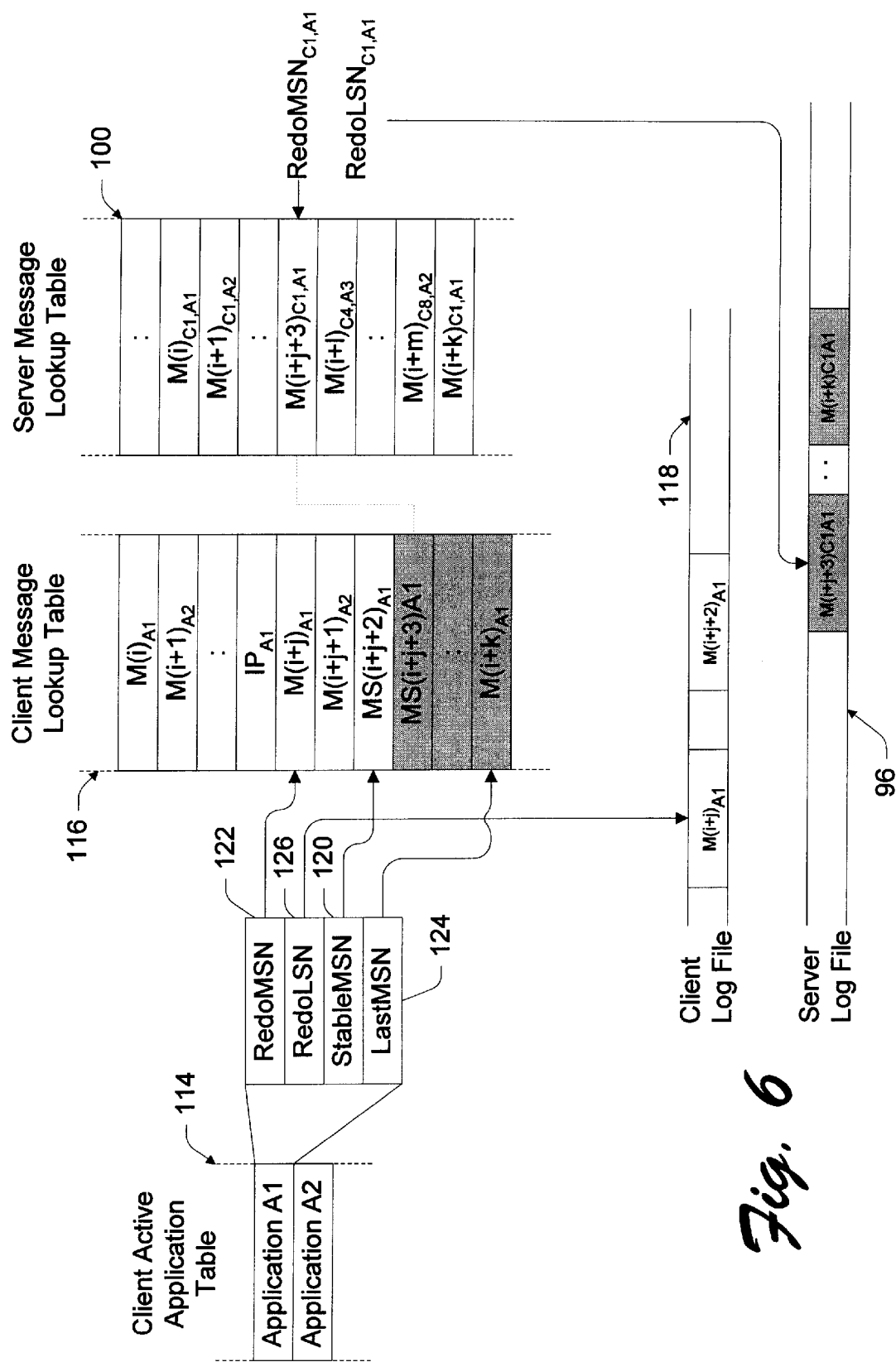
FIG. 6 shows data structures maintained at the client and server to track messages exchanged between them, and a portion of stable log file maintained at the server.

FIG. 6 shows the interrelationship of the client active application table 114, client and server message lookup tables 116 and 100 respectively, and the client's and server's stable log files 118 and 96 respectively.

The client active application table 114 lists entries for currently active applications, including application A1 and application A2. Each entry in the client active application table 114 has four fields: a StableMSN field 120, a RedoMSN field 122, a LastMSN field 124, and a RedoLSN field 124. The client message lookup table 116 and the server message lookup table 100 each show a series of entries for client-server messages. The message entries for individual applications are kept in chronological order of the MSNS. The entries do not, however, have to be kept in chronological sequence across all active applications. Rather, entries can be discarded on a per application basis as permitted by the logging and installation activities of each application. The notation "$M(x)_A$" means the message for an application "A" that has been tagged with an MSN of "x". Consider, for example purposes, the MSN pointers for the application A1.

A LastMSN$_{A1}$ pointer from field 124 of the client active application table 114 references the last message for application A1 (i.e., $M(i+k)_{A1}$) in the client message lookup table 116. A RedoMSN$_{A1}$ pointer from field 122 references an entry with the oldest MSN that follows the most recent installation point (IP) of the application A1 (i.e., $M(i+j)_{A1}$). These messages represent the start and end respectively of the sequence of messages that need to be replayed to recover application A1 to bring its state from the present stable version indicated by $IP_{A1}$ to the last state reached thus far.

A StableMSN$_{A1}$ pointer from field 120 references the last entry that is stable on the client log 118. In this example, the StableMSN$_{A1}$ pointer references message $M(i+j+2)_{A1}$, which is recorded on the client message lookup table 116 and the client log 118. Log records for messages that follow $M(i+j+2)_{A1}$, as represented by the shaded log records in server log file 96 and corresponding entries in client message lookup table 116, must be requested from the server should a system crash occur.

A RedoLSN$_{A1}$ pointer from field 126 references the log record for the oldest message in the client message lookup table 116 on the client log 118 used to recover client application A1 in an event of a client crash. In this case, the RedoLSN$_{A1}$ pointer is to message $M(i+j)_{A1}$, which corresponds to the same message being referenced in the client lookup table 116 by the RedoMSN$_{A1}$ pointer from field 122.

The server active application table 98 has a RedoMSN pointer (labeled "RedoMSN$_{C1,A1}$") for the application A1 running on the client C1. The RedoMSN$_{C1,A1}$ pointer references a message $M(i+j+3)_{C1,A1}$ in the server message lookup table 100 that is the oldest message for client application C1,A1 that is not known to be stable on the client.

A corresponding RedoLSN$_{C1,A1}$ pointer references an entry in the server stable log 96 that contains the corresponding log record for the oldest message $M(i+j+3)_{A1}$ for client application C1,A1 that is not known to be stable on the client. This record must not be truncated from the server log 96. If a redo recovery is needed, this message recorded in the log record is made available to client application A1. Log records must be present on the server log 96 for this and all subsequent messages for application A1, as represented by the shaded records. Note that by combining the logs of the client and the server, all records from application A1 on client C1 that are in the sequence from RedoMSN$_{A1}$ to LastMSN$_{A1}$ are stable and hence recoverable to recover application A1. As shown in the example, these records are disjoint, but that is not necessary. There can be overlap of the log records, where both client and server logs contain a log record for a message, but gaps are not permitted.

Both the server and the client continuously truncate obsolete parts of their respective stable logs and message lookup tables. Log truncation frees up disk space and memory space. Without truncation, the server would have to keep reply log records forever and the log scan time during a restart would grow without bound. Log truncation, which is a form of garbage collection, is thus very beneficial for the server. Log truncation is discussed separately below, as it pertains to the client and to the server.

Client Log Truncation

In general, the client 52 may discard all log records in stable log 118 and all record entries in message lookup table 116 of an active application at each new installation point for that application. However, when the client runs multiple applications simultaneously, the client may not yet be allowed to truncate the stable log file, as other applications may still need parts of the log file earlier than the soon-to-be truncated portion based on the subject application.

The client marks the progress for the installed application in the active application table by setting its RedoMSN entry to the MSN of the installation point. The minimum RedoMSN among all active applications determines the part of the log file that the client needs to keep. The client applications play the role of dirty database pages. To quickly reconstruct the minimum RedoMSN after a failure without having to scan the entire log, the client periodically generates a checkpoint log record that contains the active application table. This is a standard technique of database-style logging and recovery, applied here to application message logging.

Server Log Truncation

As the server 54 does not itself create application installation points, it has no direct information about when it can safely discard log records pertaining to the client reply messages and hence when it can truncate its log file. Rather, the server 54 relies on notifications from the client 52 to inform the server when certain log records are no longer needed. These notifications are known as "stability notifications." To avoid extra messages, a stability notification can be piggybacked on a subsequent request message sent to the server.

The client 52 sends a stability notification on one of two conditions: (1) an application installation point or (2) the writing of reply log records to the client stable log file 118. With respect to the first condition, the client occasionally installs the application state as part of the client-independent recovery scheme. Installing application state alleviates the need for the server to hold previous reply message log files on behalf of the client because the stable application state already captures these previous replies.

With respect to the second condition, the client application restart time can be significantly reduced if the client can perform some "lazy logging" itself, by writing reply log records to stable storage 118 in a non-forced manner whenever there is available disk bandwidth. This reduces the number of log records that need to be retrieved from the server during replay, thereby reducing the application restart time. Thus, when the client logs reply messages, the server no longer needs to maintain its copies of the reply messages on its stable log.

Figure 7:
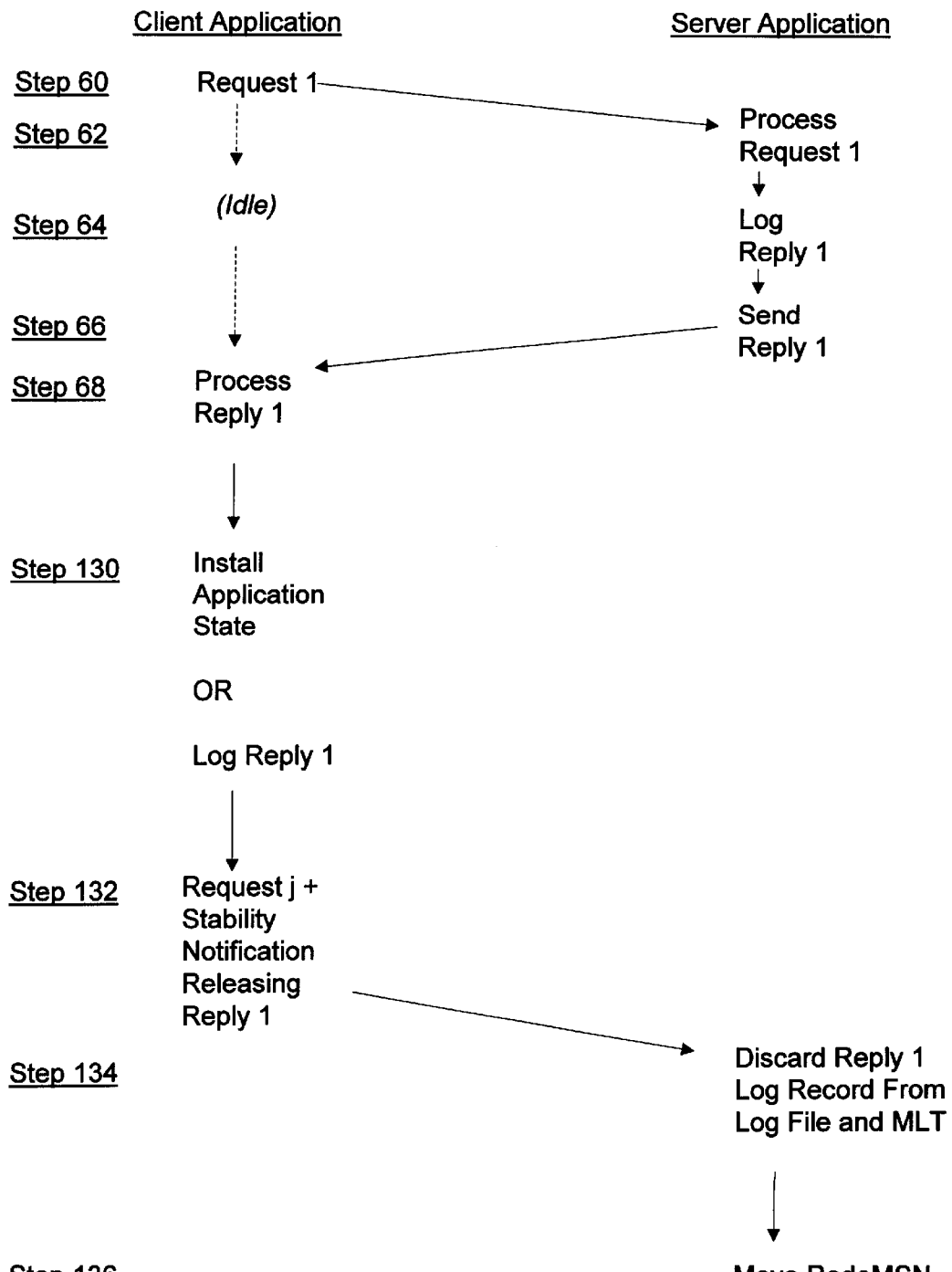
FIG. 7 is a process diagram showing similar to FIG. 3, but further shows process steps to inform the server that log records of certain client replies are no longer necessary.

FIG. 7 shows process steps in which the client sends stability notifications to the server to release previously logged reply log records. Steps 60–68 are identical to those shown in FIG. 3, with the added notation of "1" to identify a particular request and reply sequence. At step 130, the client performs one of the following two functions: (1) installs the application state of the client application or (2) logs reply messages, including the reply 1, received previously from the server. Either of these events triggers a stability notification.

At step 132, the client attaches a stability notification to a subsequent request j. The stability notification informs the server that the log record of reply 1 is no longer necessary. The client includes in the stability notification the MSN of the reply 1 message, which is effectively the StableMSN for the particular application. At step 134, the server uses the MSN to find the reply log record for reply 1 in the message lookup table 100. The server then removes the reply log record from the message lookup table 100 and sometime thereafter, when the log file 96 is truncated, discards the log record from the log file. At step 136, the server sets the RedoMSN for the corresponding application in the active application table 98 to the smallest MSN higher than the discarded message, and adjusts the corresponding system RedoLSN in the log file 96 accordingly.

It is noted that the client may release several log files as a result of installing application state or logging replies. In this case, the stability notification may only contain information on the message with the most recent MSN. Upon receiving a stability notification with this StableMSN, the server discards all entries in its message lookup table 100 that pertain to that particular application that have MSNs smaller than or equal to this StableMSN. The server also sets the application's RedoMSN in the active application table 98 to the smallest MSN higher than the last discarded message.

The server does not need to make stable the changes to its message lookup table 100 and active application table 98 that result from a stability notification by, for example, generating a checkpoint log record. The server may, however, generate a log record to mark this event in the log, but this log record can be very short and need not be forced. Consequently, if the server fails, it may not remember that it effectively truncated its log file and it may scan the log starting from overly old RedoMSNs. However, this does not affect correctness.

Client Application Termination

When a client completes an application, it informs the server that the application has completed. Application termination is a special condition that involves an independent stability notification so that the server can remove the application from its active application table and all corresponding messages from the message lookup table. The server also forces a log record to the stable log file indicating application termination or alternatively generates a checkpoint log record with an updated copy of the entire active application table.

Without these procedures, the server may lose a stability notification from an application that terminates and will therefore not send any more notifications. The log records for the terminated application would become permanently unreclaimed garbage. This would forever prevent the server from truncating its log, a situation to be avoided.

Figure 8:
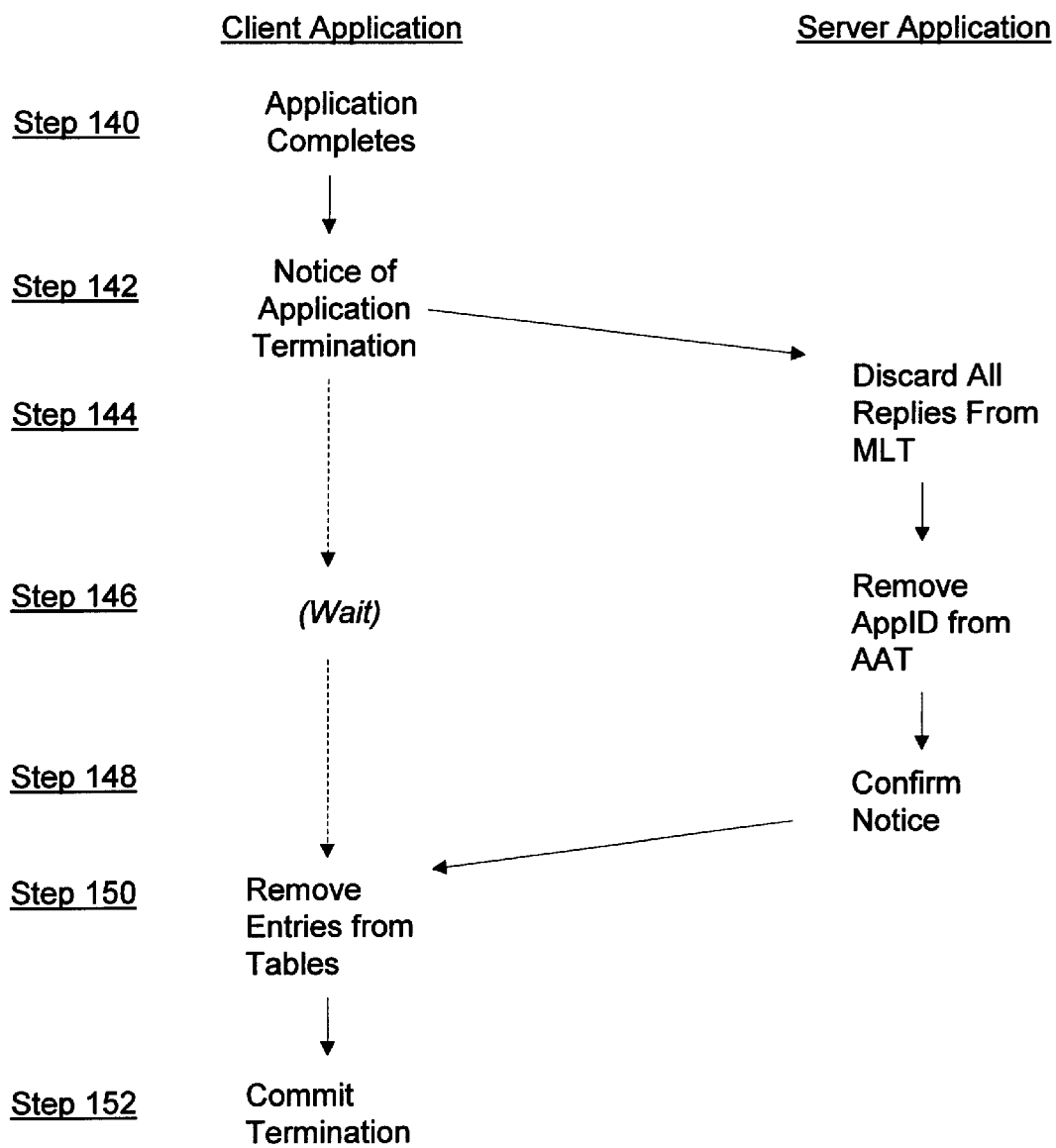
FIG. 8 is a process diagram showing similar to FIG. 3, but further shows process steps to inform the server that the client application has completed and hence log records of client replies for that application are no longer necessary.

FIG. 8 shows process steps for a client application termination. At step 140, the application completes at the client. At step 142, the client 52 sends a special message containing a notice of application termination to the server. The message contains the last MSN of a message pertaining to the completed application and the application ID (AppID) for the terminated application. After sending over the termination notice, the client waits for an acknowledgment from the server before it removes the application from its own active application table and commits the termination.

At step 144, the server 54 removes all reply records for that application from the message lookup table 100. At step 146, the server removes the application ID from the active application table 98. The server then writes to the log file an application termination log record and, when the termination log record is stable, sends a confirmation notice acknowledging the termination notice back to the client (step 148). The application's log records will be discarded from the stable log file 96 when the log is truncated subsequently.

At step 150, the client removes the application from its own active application table 114 and the reply records in the message lookup table 116. At step 152, the client commits the termination by writing a log record that documents its termination.

Server Recovery

When restarting after a server failure, the server performs an "analysis pass" and a "redo pass" over the stable log file 96. The analysis pass starts from the most recent checkpoint log record (found by looking up the bootstrap file) and scans all log records until the end of the log. For application recovery, this pass rebuilds the active application table 114. This table 114 is re-initialized from the information in the checkpoint log record, and is then updated whenever the log scan encounters a stability notification log record for the application, which documents either an application installation point, application logging of a reply message, or application termination. At the end of the analysis pass, the server 54 knows for which applications it may have to recreate replies. It also knows a RedoMSN and a corresponding RedoLSN for each application, so that it can bound the part of the log that contains the potentially required reply log records. In addition, the analysis pass also tracks down incompletely executed requests, which need special treatment, as discussed below.

The redo pass starts from the minimum of the RedoMSN values among all active applications or the minimum RedoLSN among all database pages in the server's DirtyPageTable, whichever is older. For client application recovery, the focus is on the redo of the message log records. However, since request execution can write to pages of the database, normal database redo is also performed in the redo scan. The server redo pass rebuilds the message lookup table 100 so that it eventually returns to the state as of the crash. The server 54 can then deliver logged replies to re-submitted requests in case a client application fails and subsequently restarts as well.

A case that needs special consideration is the handling of incomplete request executions where the server has logged redo steps for database writes of a request. The request log record itself and corresponding undo or read log records are guaranteed to be on the stable log file at their original points in the interleaved request-execution history. Consider the following two cases.

1. Undo log records are relevant for request-reply interactions that serve as boundaries for a single transaction. The server undoes the database writes of all incomplete requests, subsequently executes these requests again as if they were new requests, and finally generates the corresponding replies.

2. Read log records permit the server to deterministically replay the partial execution of the incomplete requests and then continue executing the requests to completion, and hence generating replies.

In both cases, the replies are then handled like replies during normal operation: they are inserted into the message lookup table, forced to the stable log file, and finally sent to the client. From this point on the server is again in its normal operation mode. Client requests that are lost because the request log record is not forced are re-executed when the client re-submits the request.

Client Recovery

Like server restart, client restart also consists of an analysis pass and a redo pass over its stable log file 118. The analysis pass is identical to the server's process and rebuilds the client's active application table 114. This table lists all applications that are to be recovered. The client recovery restarts the applications that were active at the time of the client failure, resuming their execution in a way that is transparent to the human user. This leads to the following differences.

The RedoMSN of an application identifies the oldest log record needed for is recovery of that application. This may be either the first log record following the application's most recent installation point, or the installation point MSN itself if no more recent log record exists. Note that the RedoMSN determined by the analysis pass is a lower bound on the truly required RedoMSN. It is possible for an installation point to occur just before the system fails and for the log record describing the installation point to fail to be written to the stable log. In this case, a better RedoMSN can be determined from reading the application installation point and examining its tag MSN.

The client's redo pass then starts scanning the log 118 from the oldest RedoMSN of all applications in the reconstructed active application table 114. The log records of all applications at this client are processed in a single pass over the log as opposed to making a separate pass per application. This is an optimization for clients that run "middle-tier" application services and may thus have a large number of concurrently active applications.

Each of these applications is re-incarnated upon encountering its analysis-determined RedoMSN log record (i.e., the lower bound for the RedoMSN) during the redo pass. The MSN that tags the application installation point is used to determine the true RedoMSN, which may be later because the system may have failed before the stable writing of the log record for this installation point. All log records for the application are ignored until the point at which the true RedoMSN is encountered.

An application is then re-executed asynchronously to the further redo processing of the log (i.e., in a separate process or thread). Note that application requests can also be re-executed in a similar fashion. As during normal operation, all requests of the application are intercepted. At these points, either client recovery has already encountered the corresponding reply log record or the application process pauses until it is encountered. If the reply has been encountered, then it is replayed. Otherwise the application waits and replays the reply at the point when it is encountered during the log scan. Application replay proceeds after the reply has been redone. Note that with asynchronous application re-execution, application restart is sped up substantially, which is especially important if applications perform long computations between server or user interactions.

The client's redo pass over the log file 118 proceeds in parallel with application re-execution. It re-creates the client's message lookup table 116 to the state as of the last stable log record. During the application re-execution, user input messages are consumed from the message lookup table 116, and output messages to the user can be re-created as part of the application re-execution. All output messages which are followed by a log record of that application are suppressed (i.e., not sent to the user) as they would be duplicated. There is a chance of repeating the very last output message or of missing the very last input message, regardless of how quickly the log is forced. A system failure can occur between the time of the input and the time when the input is logged. The best that can be done is to reduce the probability that this will occur. Similarly, on output, it is possible for the output to be lost before the user sees it, even if it were "sent". Regardless of logging, it is impossible to tell whether the user has seen the output or not. Thus, one has to re-present the last output in any case.

For the request and reply log records, the client's analysis pass has also reconstructed the StableMSN for each active application. So the redo pass knows which log records it will eventually encounter on its stable log file. All other, more recent reply log records have to be retrieved from the server. However, the client does not know its exact point of failure; so it does not know if there are additional log records on the server.

When application re-execution reaches the last locally logged reply, application execution simply continues beyond this point and re-enters normal operation. The client executes the application until the next interception point and sends the request to the server. The client cannot (and does not have to) tell whether this request is a re-send or if it is the original send. On a re-send, the server sends back a previously logged reply. For a new request, the server does its normal request execution. One possible optimization is to check with the server right after the client's analysis pass, and ask the server to asynchronously ship the reply log records that are more recent than the client application's StableMSN.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. In a client-server computer system having a client and a server, a computer-implemented method comprising the following steps:
   client sending a request from the client to the server;
   server processing the request to prepare a reply to the request;
   forcibly logging in a stable log at the server a log record containing the reply;
   sending the reply from the server to the client after the log record is logged in the stable log; and
   wherein the log record is the only forced logging event for the request/reply exchange.

2. A computer-implemented method as recited in claim 1, wherein the server logging steps comprise capturing in the log information that enables undo recovery of incomplete requests in the event of a system crash.

3. A computer-implemented method as recited in claim 1, wherein the server logging steps comprise capturing in the log information, including data read by the request, that enables redo recovery of incomplete requests so that their execution can continue, in the event of a system crash.

4. A computer-implemented method as recited in claim 1, wherein the server logging steps comprise capturing in the log information, including references to data read, that enables redo recovery of incomplete requests so that their execution can continue, in the event of a system crash.

5. A computer-implemented method as recited in claim 1, further comprising the step of maintaining at both the server and the client an active application table listing currently active applications for which the server or the client is responsible.

6. A computer-implemented method as recited in claim 5, further comprising the step of recovering only the applications listed on the active application table following a crash.

7. A computer-implemented method as recited in claim 1, further comprising the step of maintaining at both the server and the client a message lookup table that temporarily stores records of replies sent from the server to the client.

8. A computer-implemented method as recited in claim 7, further comprising the step of using the reply record from the message lookup table should the client resubmit the associated request during recovery from a client crash.

9. A computer-implemented method as recited in claim 7, further comprising the step of removing reply records from the message lookup table in response to either of the following events: (1) the client installs an application state of an application to which the reply pertains, or (2) the client logs the reply in a stable log at the client.

10. A computer-implemented method as recited in claim 1, further comprising the step of tagging each reply with a message sequence number (MSN).

11. A computer-implemented method as recited in claim 10, further comprising the step of tracking at the client a last used MSN for each application running on the client.

12. A computer-implemented method as recited in claim 10, further comprising the step of tracking at the client, for each application running at the client, a "redo" MSN that is one of (1) an oldest MSN that follows a most recent installation point of the application, or (2) an MSN assigned to the installation point itself if no more recent message for the application exists.

13. A computer-implemented method as recited in claim 10, further comprising the step of tracking at the client, for each application running at the client, a "stable" MSN that pertains to reply messages that are not stable at the client but may have stable log records at the server.

14. A computer-implemented method as recited in claim 1, further comprising the step of subsequently logging in a stable log at the client a client log record containing a reply received from the server.

15. A computer-implemented method as recited in claim 14, further comprising the step of discarding the client log record from the client's stable log in response to installing an application state of an application to which the reply pertains at a point in time after receipt of the reply from the server.

16. A computer-implemented method as recited in claim 1, further comprising the following steps:
generating a stability notification at the client in response to one of (1) installing an application state of an application responsible for the request in a stable log at the client some time after the reply is received from the server, or (2) slogging in the client's stable log the reply received from the server;
sending the stability notification from the client to the server; and
discarding the log record from the stable log at the server in response to receiving the stability notification.

17. A computer-implemented method as recited in claim 1, further comprising the following steps:
completing an application at the client;
sending a notice of termination from the client to the server;
logging at the server that the client application has terminated;
discarding all log records for replies pertaining to the application from the stable log at the server in response to receiving the notice of termination;
sending a confirmation of the termination notice from the server to the client; and
terminating the application at the client following receipt of the confirmation.

18. A computer-implemented method as recited in claim 1, further comprising the step of using the log records for replies at the server's stable log to recover the client following a client crash.

19. Computer-readable media distributed at the server and the client having computer-executable instructions to perform the steps in the method as recited in claim 1.

20. In a server computer system for serving one or more clients, a computer-implemented method implemented at the server computer system comprising the following steps:
receiving a request from a client;
processing the request to prepare a reply to the request without logging the request in a stable log;
forcibly logging in the stable log a log record containing the reply; and
sending the reply to the client after the log record is logged in the stable log.

21. A computer-implemented method as recited in claim 20, wherein the server logging steps comprise capturing in the log information that enables undo recovery of incomplete requests in the event of a system crash.

22. A computer-implemented method as recited in claim 20, wherein the server logging steps comprise capturing in the log information, including data read by the request, that enables redo recovery of incomplete requests so that their execution can continue, in the event of a system crash.

23. A computer-implemented method as recited in claim 20, wherein the server logging steps comprise capturing in the log information, including references to data read, that enables redo recovery of incomplete requests so that their execution can continue, in the event of a system crash.

24. A computer-implemented method as recited in claim 20, further Comprising the step of maintaining an active application table listing currently active applications running at the client.

25. A computer-implemented method as recited in claim 24, further comprising the step of recovering only the applications listed on the active application table following a crash.

26. A computer-implemented method as recited in claim 20, further comprising the step of maintaining a message lookup table that temporarily stores records of replies sent to the client.

27. A computer-implemented method as recited in claim 26, further comprising the step of using reply records from the message lookup table during recovery of the client in place of the log record on the stable log.

28. A computer-implemented method as recited in claim 26, further comprising the step of removing the reply record from the message lookup table in response to either of the following events: (1) the client installs an application state of an application to which the reply pertains, or (2) the client logs the reply in a stable log at the client.

29. A computer-implemented method as recited in claim 20, further comprising the following steps:
receiving a stability notification from the client indicating one of (1) that the client installed an application state of an application to which the reply pertains some time after the reply is sent to the client, or (2) that the client logged the reply in a client-side stable log; and
discarding the log record from the stable log in response to receiving the stability notification.

30. A computer-implemented method as recited in claim 20, further comprising the following steps:
receiving a notice of termination from the client indicating that an application to which the reply pertains is terminating; and
discarding from the stable log all log records for replies pertaining to the terminating application in response to receiving the notice of termination.

31. A computer-implemented method as recited in claim 20, further comprising the step of using the log record to recover the client following a client crash.

32. A computer programmed to perform the steps in the method as recited in claim 20.

33. A computer-readable media distributed at the server and the client, which directs server and client to perform the steps in the method as recited in claim 20.

34. In a server computer system for serving a client, a computer-implemented method implemented at the server computer system comprising the following steps:
storing an application identification of an active application executing on the client in an active application table;

receiving from the client a request generated by the application and identified via an application identification;

force logging, in a stable log, a log record containing a reply to the request;

storing the reply in a message lookup table; and sending the reply to the client.

35. A computer-implemented method as recited in claim 34, further comprising the step of recovering only the active applications listed on the active application table following a client crash.

36. A computer-implemented method as recited in claim 34, further comprising the step of using the reply stored in the message lookup table in place of the log record to recover the client from a client crash.

37. A computer-implemented method as recited in claim 34, further comprising the step of removing the reply from the message lookup table in response to either of the following events: (1) the client installs an application state of the application, or (2) the client logs the reply in its stable log.

38. A computer-implemented method as recited in claim 34, further comprising the step of occasionally storing the active application table and the message lookup table on the stable log.

39. A computer programmed to perform the steps in the method as recited in claim 34.

40. A computer-readable media distributed at the server and the client, which directs server and client to perform the steps in the method as recited in claim 34.

41. In a client-server computer system having a client and a server, an application recovery system comprising:

a client-side application that executes on the client to send a request to the server;

a server-side application request program that executes on the server to process the request, prepare a reply to the request, and return the reply to the client; and a resource manager that executes on the server to create a stable log file that can be used to recover the client-side application in the event of a system crash, the resource manager being configured to forcibly log in the stable log file a log record containing the reply, wherein the log record is the only forced logging event for the request/reply exchange.

42. An application recovery system as recited in claim 41, wherein the resource manager captures in the log information that enables undo recovery of incomplete requests in the event of a system crash.

43. An application recovery system as recited in claim 41, wherein the resource manager captures in the log information, including data read by the request, that enables undo recovery of incomplete requests so that their execution can continue, in the event of a system crash.

44. An application recovery system as recited in claim 41, wherein the resource manager captures in the log information, including references to data read, that enables redo recovery of incomplete requests so that their execution can continue, in the event of a system crash.

45. An application recovery system as recited in claim 41, wherein the resource manager maintains an active application table listing currently active applications running on client.

46. An application recovery system as recited in claim 45, wherein the resource manager recovers only the applications listed on the active application table following a system crash.

47. An application recovery system as recited in claim 41, wherein the resource manager maintains a message lookup table that temporarily stores records of the replies sent to the client.

48. An application recovery system as recited in claim 47, wherein the resource manager uses the reply record from the message lookup table in place of the log record in the stable log to recover the client-side application following a client crash.

49. An application recovery system as recited in claim 47, wherein the resource manager removes the reply record from the message lookup table in s response to either of the following events: (1) the client installs an application state of an application to which the reply pertains, or (2) the client logs the reply in a stable log at the client.

50. An application recovery system as recited in claim 41, further comprising a client-side resource manager that executes at the client, the client-side resource manager tracking the last received reply for the client-side application.

51. An application recovery system as recited in claim 41, further comprising a client-side resource manager that executes at the client, the client-side resource manager tracking one of (1) an oldest reply that is received after a most recent installation point of the client-side application, or (2) the installation point itself.

52. An application recovery system as recited in claim 41, further comprising a client-side resource manager that executes at the client, the client-side resource manager tracking reply messages that are not stable at the client but may have stable log records at the server.

53. An application recovery system as recited in claim 41, further comprising a client-side resource manager that executes at the client, the client-side resource manager occasionally logging in non-forced manner, in a stable log at the client, a client log record containing the reply received from the server.

54. An application recovery system as recited in claim 41, further comprising:

a client-side resource manager that executes at the client, the client-side resource manager occasionally (1) installing an application state of client-side application in a stable log at the client, or (2) logging in the client's stable log the reply received from the server;

the client-side resource manager sending a stability notification to the server indicating that the reply is now stably recorded at the client or that the reply is no longer needed at the server because a later application state has been installed; and the resource manager at the server being configured to discard the log record from the stable log at the server in response to receiving the stability notification.

55. An application recovery system as recited in claim 41, wherein:

the client-side application completes and sends a notice of termination to the server;

the resource manager forces a log record describing the application termination;

the resource manager is configured to discard all log records for replies pertaining to the client-side application from the stable log in response to receiving the notice of termination.

56. An application recovery system as recited in claim 41, wherein the resource manager uses the log records to recover the client-side application following a client crash.

57. A server computer system for serving one or more clients, comprising:
- a volatile main memory having a log buffer;
- a non-volatile memory that persists across a system crash, the non-volatile memory having a stable log;
- a processing unit coupled to the main memory and the non-volatile memory;
- an application stored in the volatile main memory and executable on the processing unit to receive and process requests from a client and to send a reply back to the client; and
- a resource manager stored in the volatile main memory and executable on the processing unit to record the reply in the log buffer and to commit the reply record to the stable log when the reply is sent back to the client.

58. A server computer system as recited in claim 57, wherein the resource manager captures in the logged reply record information that enables undo recovery of incomplete requests in the event of a system crash.

59. A server computer system as recited in claim 57, wherein the resource manager captures in the logged reply record information, including data read by the request, that enables redo recovery of incomplete requests so that their execution can continue, in the event of a system crash.

60. A server computer system as recited in claim 57, wherein the resource manager captures in the logged reply record information, including references to data read, that enables redo recovery of incomplete requests so that their execution can continue, in the event of a system crash.

61. A server computer system as recited in claim 57, wherein the resource manager maintains an active application table listing currently active applications running on the client.

62. A server computer system as recited in claim 61, wherein the resource manager recovers only the applications listed on the active application table following a crash.

63. A server computer system as recited in claim 57, wherein the resource manager maintains a message lookup table that temporarily stores reply records.

64. A server computer system as recited in claim 63, wherein the resource manager uses the reply record from the message lookup table during recovery of the client in place of the log record on the stable log.

65. A server computer system as recited in claim 57, wherein the resource manager discards the reply record from the stable log in response to receiving a notification from the client indicating (1) the client has installed an application state of an application to which the reply pertains, or (2) the client has logged the reply in a stable log at the client.

66. A server computer system as recited in claim 57, wherein the resource manager discards the reply record from the stable log in response to receiving a notification from the client indicating that an application to which the reply pertains is terminating.

67. A server computer system as recited in claim 57, wherein the resource manager uses the reply record from the stable log to recover the client following a client crash.

68. For use on a server computer system having a non-volatile memory with a stable log, a stable database, a volatile main memory with a log buffer, and a processing unit, in which the server computer system receives requests from one or more clients and returns replies to the clients, a resource manager executable on the server processing unit to record a client reply in the log buffer and to manage when to flush the reply record from the log buffer to the stable log, the resource manager being configured to commit the reply record to the stable log at or just before a time when the reply is sent to the client.

69. A resource manager as recited in claim 68, further configured to maintain an active application table listing currently active applications running on the client.

70. A resource manager as recited in claim 69, further configured to recover only the applications listed on the active application table following a crash.

71. A resource manager as recited in claim 68, further configured to maintain a message lookup table that temporarily stores a copy of the reply record committed to the stable log.

72. A resource manager as recited in claim 71, further configured to use the reply record from the message lookup table during recovery of the client in place of the log record on the stable log.

73. A resource manager as recited in claim 71, further configured to remove the reply record from the message lookup table in response to client notifications of either of the following events: (1) the client installs an application state of an application to which the reply pertains, or (2) the client logs the reply in a stable log at the client.

74. A computer-readable medium storing a resource manager as recited in claim 68.

* * * * *

UNITED STATES PATENT AND TRADEMARK OFFICE
CERTIFICATE OF CORRECTION

PATENT NO. : 6,182,086 B1
DATED : January 30, 2001
INVENTOR(S) : David B. Lomet et al.

It is certified that error appears in the above-identified patent and that said Letters Patent is hereby corrected as shown below:

Column 1,
Line 28, delete "il" after "lost".

Column 2,
Line 6, add -- "pages" -- after "as".

Column 3,
Line 32, add -- and -- after "22-29".

Column 4,
Line 28, change "modem" to -- modern --.

Column 8,
Line 40, delete "io" after "that"

Column 11,
Line 37, delete "1" after "a".

Column 16,
Line 60, delete "is" after "for".

Column 19,
Line 32, change "slogging" to -- logging --.

Column 20,
Line 17, change "Comprising" to -- comprising --.

Signed and Sealed this

Second Day of October, 2001

Attest:

NICHOLAS P. GODICI
Attesting Officer *Acting Director of the United States Patent and Trademark Office*